US006487669B1

(12) United States Patent
Waring

(10) Patent No.: US 6,487,669 B1
(45) Date of Patent: Nov. 26, 2002

(54) METHOD AND APPARATUS FOR A DUAL MODE OF DISPLAYING DATA AND IMAGES

(75) Inventor: Mark Waring, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/410,112

(22) Filed: Sep. 30, 1999

(51) Int. Cl.[7] .................................................. G06F 1/32
(52) U.S. Cl. ........................................ 713/324; 345/520
(58) Field of Search ................................. 713/324, 300, 713/320; 345/501, 530, 536, 520

(56) References Cited

U.S. PATENT DOCUMENTS

| | | | | | |
|---|---|---|---|---|---|
| 5,907,330 | A | * | 5/1999 | Simmers | 345/512 |
| 5,978,016 | A | * | 11/1999 | Lourette et al. | 348/64 |
| 5,995,120 | A | * | 11/1999 | Dye | 345/509 |
| 6,212,645 | B1 | * | 4/2001 | Tjandrasuwita | 713/330 |
| 2001/0015760 | A1 | * | 8/2001 | Fellegara et al. | 348/333.01 |

* cited by examiner

*Primary Examiner*—Dennis M. Butler
(74) *Attorney, Agent, or Firm*—Blakley, Sokoloff, Taylor & Zafman LLP

(57) ABSTRACT

A method and apparatus for storing information in a memory device that can be retrieved and displayed in a display device without “bootup” of the computer system.

19 Claims, 6 Drawing Sheets

METHOD AND APPARATUS FOR A DUAL MODE OF DISPLAYING DATA AND IMAGES

BACKGROUND

1. Field of the Invention

A method and apparatus is described for a computer system to display images and data without having to boot up application programs to have access to the images and/or data.

2. Background

Various application programs are available to generate and present a variety of images and data. For example, documents are commonly created using word processing programs; sales and organization charts are commonly created using graphics programs; sales figures and product specifications are commonly created using spreadsheet programs; internet information is commonly retrieved using internet programs and so forth.

In many instances, to simply view the images and/or data, the application programs that are used to generate/edit the images and/or data, need to be loaded into local memory of a computer system. Application programs, however, generally require a certain amount of time to be loaded into the memory of a computer, thereby providing a delay and inconvenience to the computer operator.

Moreover, when a computer is turned on, the computer typically performs a diagnostic and initialization process known as Power On Self Test (POST). To perform POST, the computer consumes a certain amount of time. Once the POST has been successfully executed, the computer then loads the operating system that also consumes additional time.

Therefore, there is a need for a more expeditious method of providing/displaying selected images and data, after the power of a computer system may have been turned off.

SUMMARY

The present invention provides a method and apparatus for storing information in a memory device that can be retrieved and displayed in a display device without "boot up" of the computer system.

Additional features, embodiments, and benefits will be evident in view of the figures and detailed description.

DETAILED DESCRIPTION

A method and apparatus is described in which desired information can be stored in a memory device, for example, a flash memory. The information can also be stored in other non-volatile and volatile memory devices. The information can be retrieved to be displayed in a display device such that in one embodiment, the computer system need not perform a Power On Self Test (POST) including initialization of resource devices, and/or the booting up of the application programs to access the information. Thus, the information may be displayed when a computer is not fully powered up. In the description to follow, it should be noted that the invention is broad enough to be adapted to a variety of computer architectures. It is to be further noted that the description to follow is illustrative to aid in the understanding of the invention and should not be construed as limitations.

Figure 1:
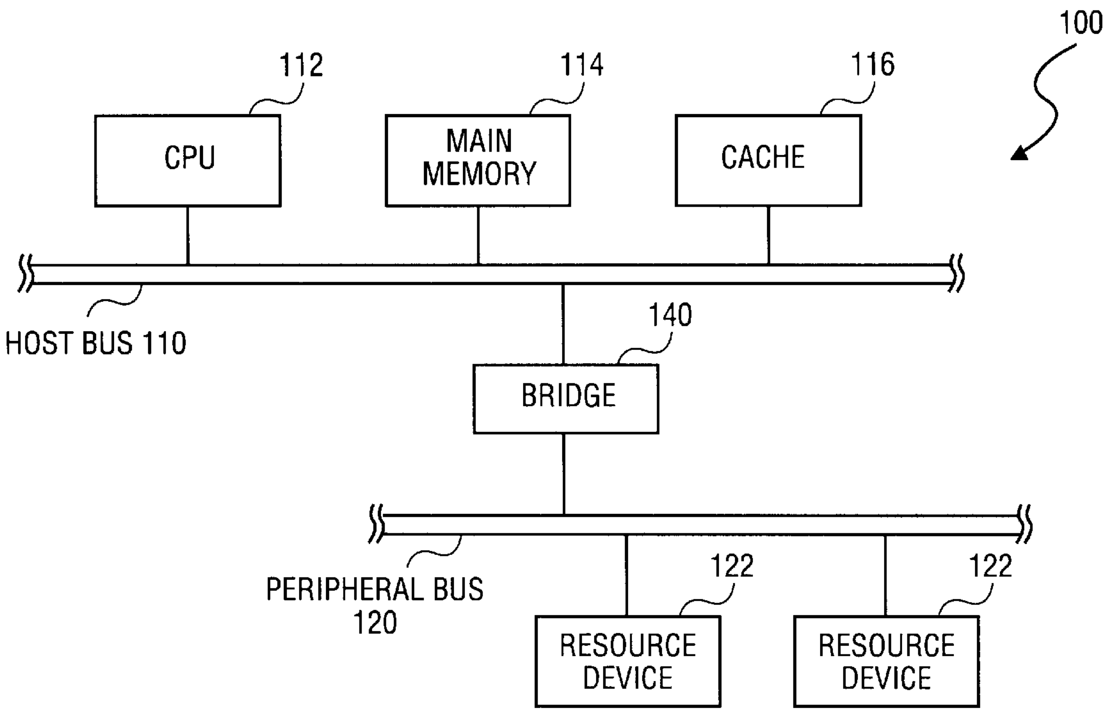
FIG. 1 (PRIOR ART)
FIG. 1 is a schematic diagram of a computer architecture.

FIG. 1 is an example of a computer architecture 100 used in various computers available commercially. As shown in the figure, the platform 100 comprises a host bus 110 and a peripheral bus 120. Coupled to the host bus 110 may be a Central Processing Unit (CPU) 112, a main memory 114 and a cache 116. The host bus 110 provides a link between the CPU 112, the main memory 114 and the cache 116. Coupled to the peripheral bus 120 may be a plurality of resource devices 122 that complements the host bus 110. The plurality of resource devices 122 may be I/O processors, memory devices, high speed Direct Memory Access (DMA) controller, video controller, modems and other peripheral devices connectable in the form of add-on cards. The peripheral bus 120 is coupled to the host bus 110 through a Bridge 140. The bridge allows transactions to occur between two buses by interfacing the address space, data space and control signals between the two buses.

When powered on, the CPU within the computer, such as the one described above, typically executes a Power On Self Test (POST) using instructions generally known as Basic Input/Output System (BIOS) stored in a memory device such as a Read Only Memory (ROM). The POST checks and initializes the various controllers and timers required for the operation of the computer. The POST further tests the memory devices of the computer for malfunction. The POST also checks for the presence or absence of resource devices and initializes those resource devices that require initialization. Once the various hardware of the computer has been tested and initialized, the POST then generally loads a predetermined operating system that takes control of the hardware.

The procedure described above is generally known as "boot up". Once the boot up has been accomplished, a user may then call the various application programs and files to perform the tasks desired by the user. Boot up generally requires a certain amount of time to be performed and this period is further extended when application programs are called. Where various information are desired immediately, such delay inconveniences the user, as is further described in the background.

Figure 2:
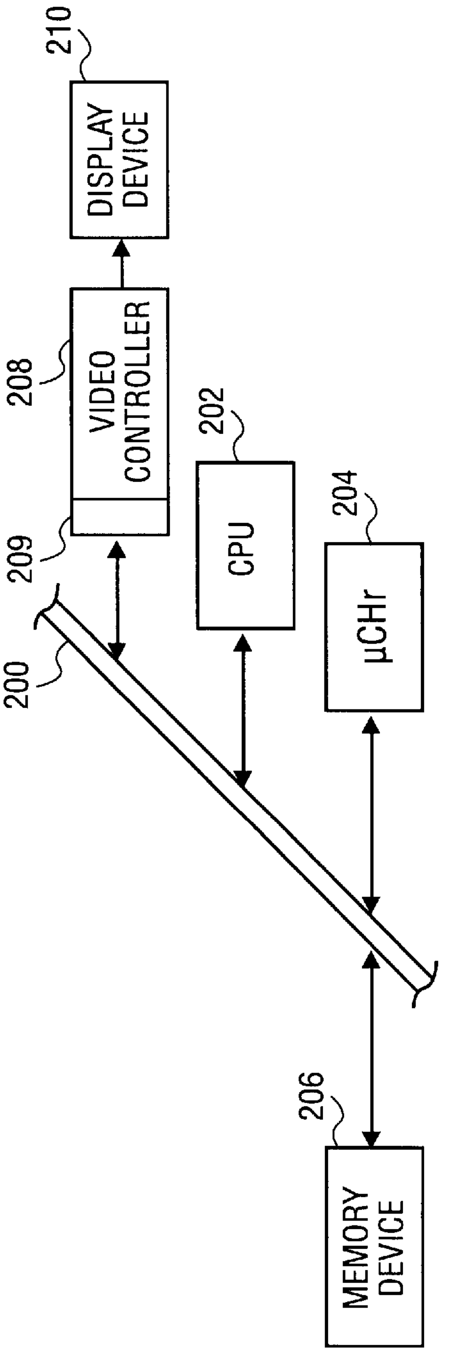
FIG. 2 is a schematic diagram of a in accordance with an embodiment of the invention.

FIG. 2 illustrates a system in accordance with an embodiment of the invention in which information may be accessed without booting up the computer and thus, reduces the wait period. In this embodiment, coupled to the bus 200, there is a CPU 202, a micro controller 204, a memory device 206, and a video controller 208 to which a display device 210 is coupled. The memory device 206 may be external to the computer and may be a non-volatile memory device inserted into the computer in a form of a card or module (see FIG. 4, for example). In one embodiment, the non-volatile memory device may be a flash memory device. In another embodiment, the memory device 206 may be part of the computer and may be Dynamic Random Access Memories (DRAMs) or Static Random Access Memories (SRAMs) which are powered by battery or other power sources during computer shut down. Of course, the memory device 206 may also be a Flash memory device. The micro controller 204 may also be external or internal to the computer depending on a design criteria. In the embodiment where the microcontroller 204 is built into the computer, the memory device 206 is provided with an interface to communicate with the microcontroller 204. The operation of the configuration will now be described.

During the operation of the computer, the user may select various information displayed on the display device 210 to be stored in the memory device 206. For example, the information may be a displayed organization chart, company profile, sales figures or a presentation. Using a keyboard or a pointing device such as a mouse (not shown), a command is sent to the CPU 202 or in an alternative embodiment, the micro controller 204, indicating that the current displayed information should be stored in the memory device 206. Depending on the memory size of the memory device 206, an entire presentation of several display screens may be stored in the memory device 206. In one embodiment, the information in the frame buffer 209 is transferred to the memory device 206 to be stored. In one embodiment, the stored information may be in a form of a bitmap. Once the desired information is stored, the computer may be turned off. However, because the memory device 206 is a non-volatile memory, the stored information is retained.

When the user desires to retrieve the stored information, the user need not turn on the computer that causes the computer to perform POST and retrieve an operating system. In the present invention, the user may press a key that is uniquely situated in the keyboard defined as "Frame-up" or "Hot" key in one embodiment (for example, see FIG. 4). In another embodiment, existing keys in the keyboard may be used, for example, the space bar. Alternatively, a separate input feature/hot key may be provided on the computer system.

Once the user presses the key of either embodiments, the key activates the micro controller 204 and its associated circuitry, and the display controller 208 and its associated circuitry. It is presumed that the display device 210 has been powered on or alternatively, the key activation also turns the display device 210 on (for example, in the case of a laptop computer). The micro controller 204 boots its associated firmware that includes the boot up sequence of the video controller 208. The micro controller 204 may also provide the timing signals for the video controller 208. Once the micro controller 204 has initialized the video controller 208, the micro controller 204 writes the information or a portion thereof stored in the memory device 206 to the frame buffer 209. The video controller 208 uses the information stored in the frame buffer 209 and displays it on the display device 210.

In the embodiment where several screens of information have been stored in the memory device 206, each time the user presses the hot key, the micro controller 204 writes another screen length of information into the frame buffer 209. Depending on the sophistication of the micro controller and the firmware, in the embodiment in which the existing keys in the keyboard are used, the "page up" and the "page down" keys, for example, may be used to move forward and backward the content of the displayed information. Alternatively, additional keys may be added to the keyboard to perform the function above.

In this manner, stored information in the memory device 206 may be displayed on the display device 210 without all of the computer being powered up and performing POST. Certain modifications may be performed on the existing computer architecture to implement the invention. For example, the power plane of the architecture may be modified such that the micro controller 204 and its associated circuitry, and the video controller 208 and its associated circuitry can be powered up while the remaining hardware of the computer remains shut down.

For example, in a laptop computer, the existing battery power may be diverted to power the mentioned devices while other hardware remains shut down. In a desktop computer, for example, additional battery power may be implemented in the computer to provide the power. Alternatively, modifications may be performed on the power supply such that the power supply provides the power to the mentioned devices when the hot key is activated.

In one embodiment, the memory device 206, the micro controller 204 and the video controller 208 are coupled to the same bus in a multiple bus architecture (see FIG. 1), for example, the peripheral bus, such that bus to bus interface through the Bridge is not required for communication between the micro controller 204, the memory device 206 and the video controller 208. In this manner, the transactions between the micro controller 204, the memory device 206 and the video controller 208 are limited to one bus while conserving power drain of the battery, for example. Further, using one bus simplifies powering the devices.

Figure 3:
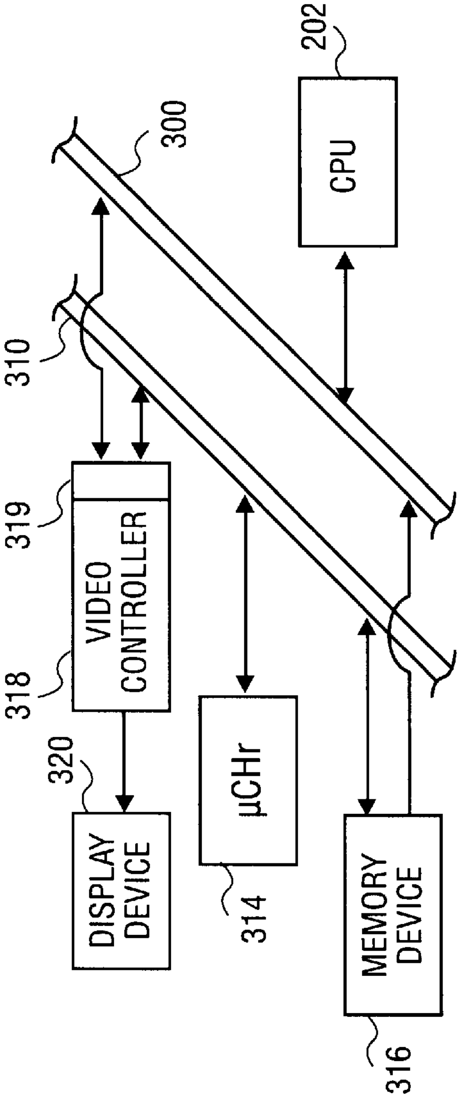
FIG. 3 is a schematic diagram of a two bus configuration in accordance with another embodiment of the invention.

In the embodiment in which the buffering of the remaining resource devices which are coupled to the bus above constitutes a problem, a second bus may be used to provide exclusive communication between the micro controller, memory device and the video controller as shown in FIG. 3. As shown, FIG. 3 illustrates a first bus 300 that may be the main bus and a second bus 310 that may be a secondary bus. Coupled to one or both buses are the CPU 312, the micro controller 314, the memory device 316 and the video controller 318 to which the display device 320 is coupled. The video controller 318 comprises the frame buffer 319. The use of the second bus 310 may simplify the selective powering up procedure in that the memory device 316, the micro controller 314, the video controller 318 and their associated circuitry may be selectively powered by powering the second bus 310. Alternatively, the two bus configuration may be used as an alternative to a one bus configuration due to design preference. The operation of the configuration illustrated in the figure is now described.

During the operation of the computer, the CPU 312 communicates with the video controller 318 and the memory device 316 through the first bus 300. The first bus 300 may be the peripheral bus in which other resource devices are also coupled. When the user desires to store certain displayed information into the memory device 316, the CPU 312 writes the information in the frame buffer 319 into the memory device 316. Note that the micro controller 314 may also perform this role. After the computer has been shut down, the user may power the micro controller 314, the video controller 318 and their associated circuitry using the hot key or existing keyboard key as described above. The key activation powers up the second bus 310 thereby powering the micro controller 310, the video controller 318 and their associated circuitry. The micro controller then boots its associated firmware that includes the boot up sequence for the video controller 318. The micro controller 314 may also provide the timing signals to the video controller 318. Using the second bus that is exclusive between the micro controller 314, the memory device 316 and the video controller 318 in this embodiment, the micro controller 314 communicates with the memory device 316 and the video controller 318. The micro controller 314 initializes the video controller 318. Once the video controller 318 has been initialized, the micro controller 314 writes the information stored in the memory device 316 to the frame buffer 319 which the video controller 318 uses to display on the display device 320.

Figure 4:
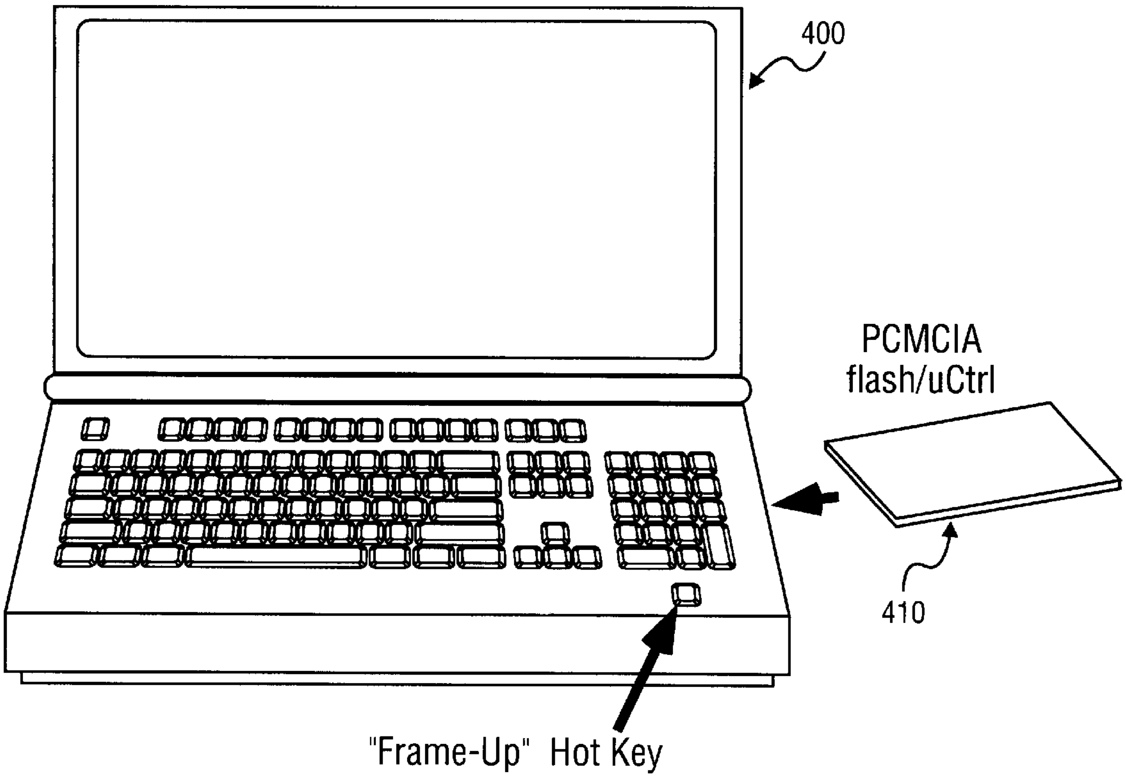
FIG. 4 illustrates memory device in accordance with an embodiment of the invention.

FIG. 4 illustrates an embodiment in which the memory device 410 in a form of a card comprises a micro controller or perhaps a logic unit that may be inserted into a computer 400. In the embodiment in which the computer includes the micro controller or the logic unit, the card may simply comprise a memory component. Although the figure shows a laptop computer, the embodiment is broad enough to cover other forms of computer including a desktop computer.

One advantage of this configuration is the portability of the retained information in the memory device card 410. For example, the information may be initially stored in the card through a desktop computer. Once stored, the card may be inserted into a laptop computer that can be carried to the various conferences for presentation purposes, for example. In another scenario, multiple presentations may be stored in multiple cards in which a particular presentation may be made using a particular card. Many forms of utilizing this configuration are conceivable.

Figure 5:
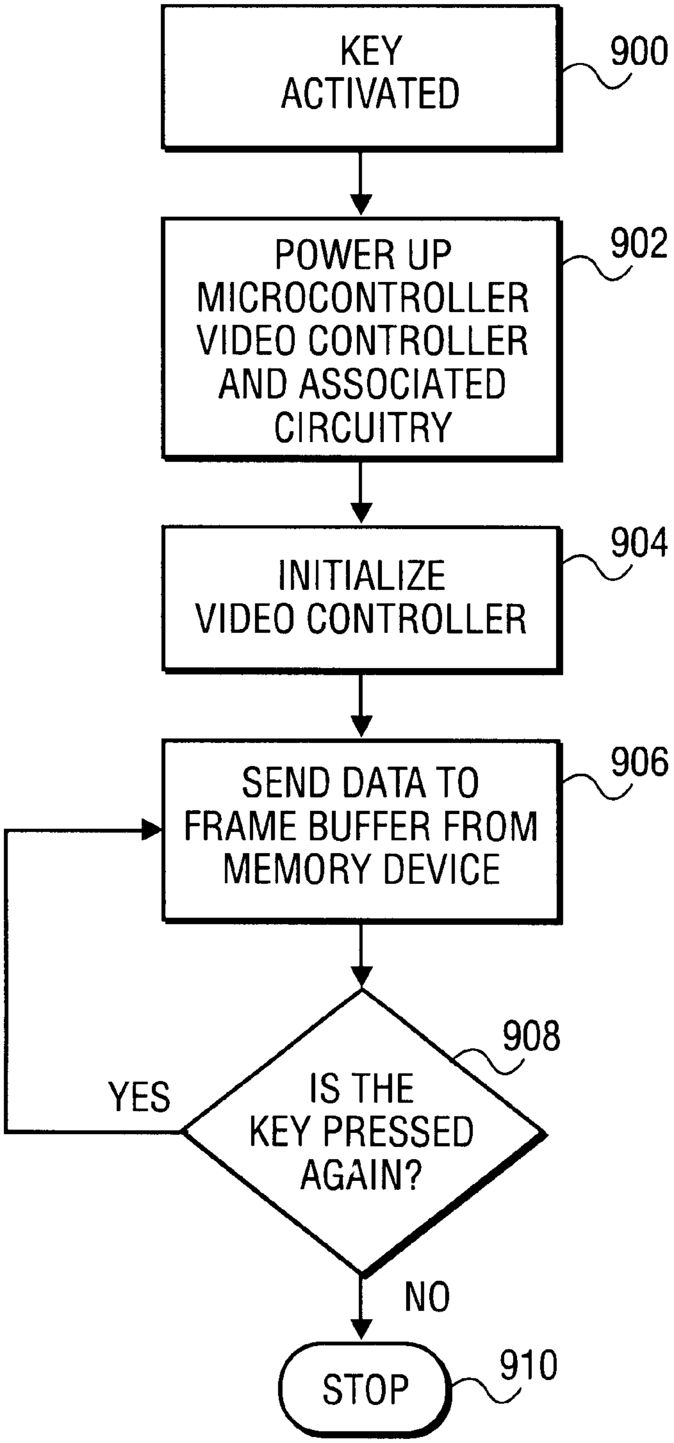
FIG. 5 is a flow chart of displaying information in accordance with an embodiment of the invention.

FIG. 5 is a flow chart that describes the process of displaying information on a display device even though the computer is "cold off". In this flow chart, it is presumed that the information is already stored in a non-volatile memory device. In block 900, a hot key or a predetermined existing key in a keyboard is activated. In block 902, the activated key causes the micro controller, video controller and their associated circuitry to be powered up. In block 904, the micro controller obtains the video controller boot up sequence from a ROM and proceeds to initialize the video controller. Once the video controller has been initialized, the micro controller loads a first information from the memory device into the frame buffer. The video controller retrieves the first information from the frame buffer and displays it on a display device. When the key is pressed once more, as depicted in block 908, the micro controller retrieves the second information from the memory device and loads it into the frame buffer. The video controller retrieves the second information from the frame buffer and displays it on a display device. This process in repeated until the user is finished with the information as depicted in block 910.

Figure 6:
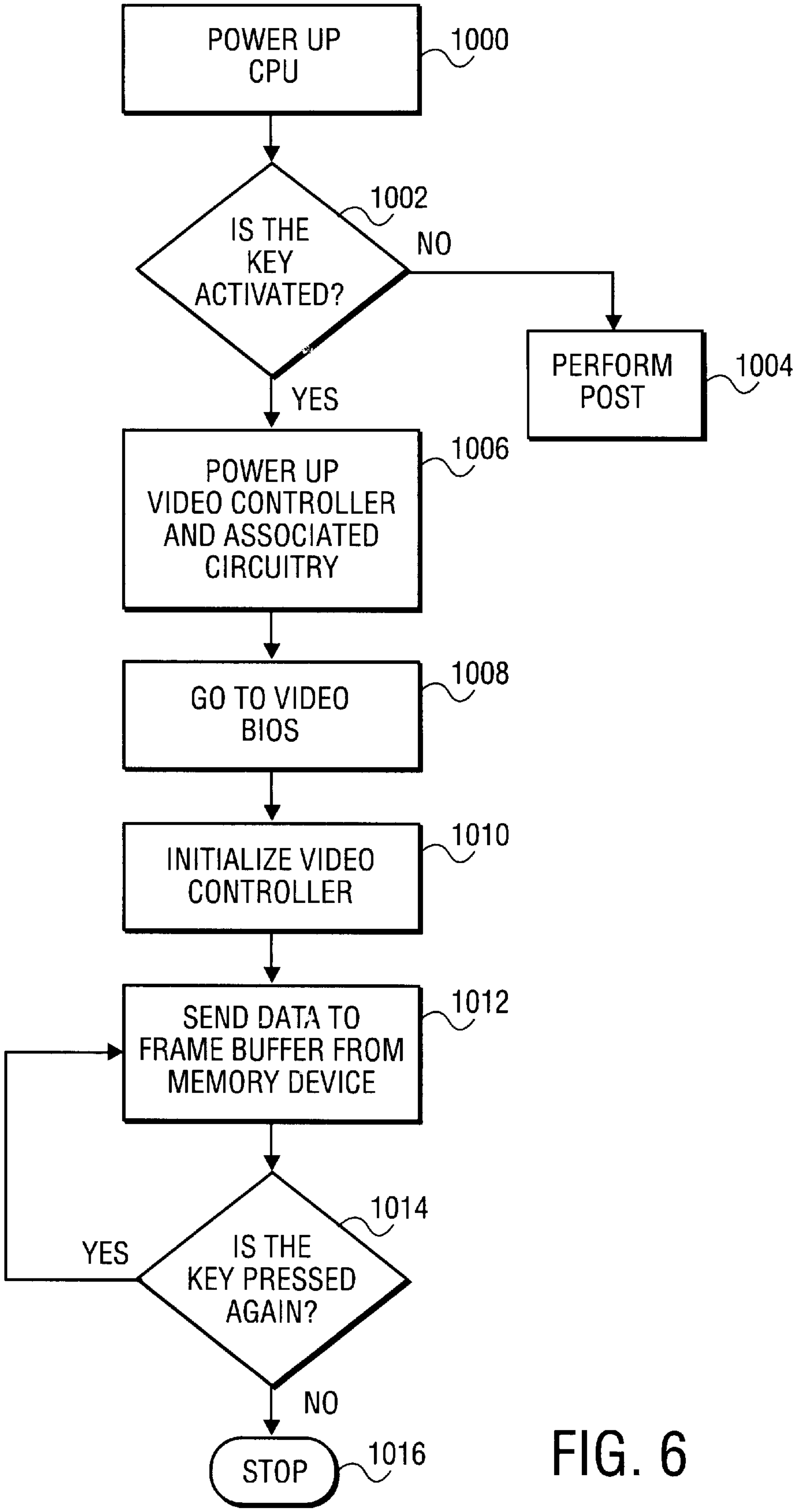
FIG. 6 is a flow chart that describes a process in which the CPU operates in a first mode or a second in accordance with one embodiment of the present invention.

FIG. 6 is a flow chart that describes a process in which the CPU operates in a first mode or a second mode depending on whether the hot key or the equivalent key has been activated. In block 1000, the CPU is powered up. In block 1002, a determination is made as to whether the CPU operates in a first mode or a second mode. In the first mode, the key has not been activated and the CPU follows the normal POST routine. In block 1006, the key as been activated and the CPU operates in a second mode. In block 1006, the video controller and its associated circuitry are selectively powered up. Otherwise the remaining hardware is cold off. In block 1008, the CPU jumps to the video BIOS in the BIOS ROM and initializes the video controller as shown in block 1010. Once the video controller is initialized, the CPU loads a first information from the memory device into the frame buffer. The video controller retrieves the first information from the frame buffer and displays it on a display device. When the key is pressed once more, as depicted in block 1014, the CPU retrieves the second information from the memory device and loads it into the frame buffer. The video controller retrieves the second information from the frame buffer and displays it on a display device. This process in repeated until the user is finished with the information as depicted in block 1016.

Figure 7:
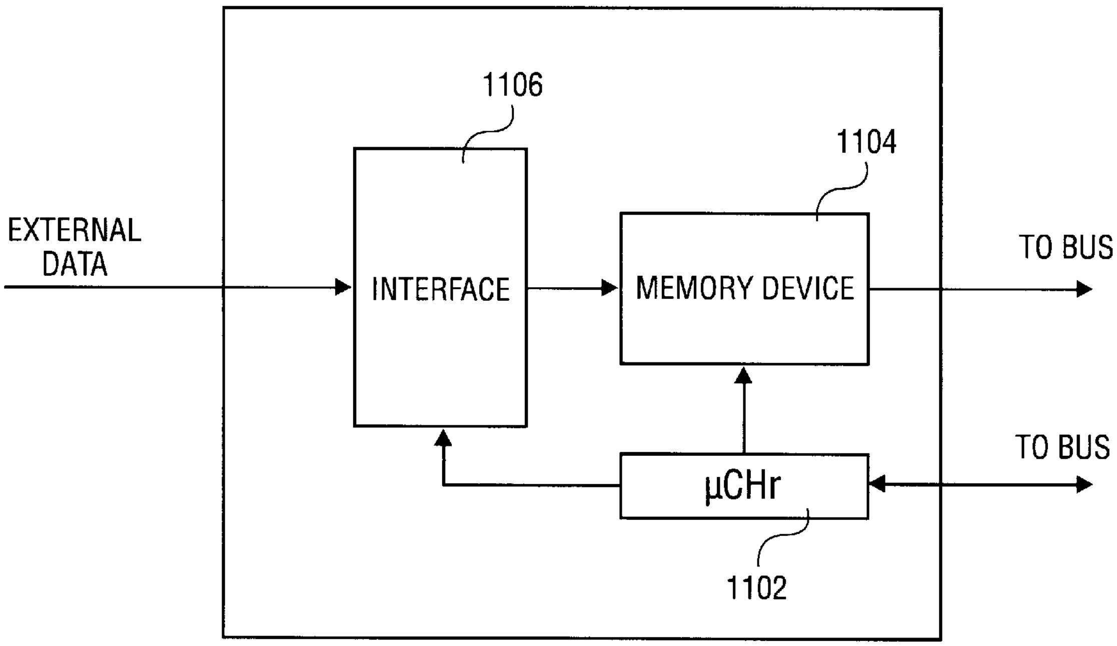
FIG. 7 is a schematic diagram of a configuration configured to receive information from an external source in accordance with an embodiment of the invention.

FIG. 7 illustrates a configuration in which information is received from an external source in accordance with an embodiment of the invention. The configuration comprises a micro controller 1102, memory device 1104 and communication interface 1106. Examples of the communication interface are Modem, network interface, serial port and parallel port, among others. In addition to the functions performed by the micro controller 1102 as described above, the micro controller 1102 further provides control to the communication interface 1106 such that external information may be received which is stored in the memory device 1104. In this example, the memory device 1104 performs as a buffer. The micro controller 1102 loads the information stored in the memory device 1104 into the frame buffer. The video controller retrieves the information from the frame buffer and displays it on a display device.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than restrictive sense.

What is claimed is:

1. An apparatus comprising:

a first memory device to retain information;

a circuit coupled to said first memory device, said circuit configured to initiate a video controller to transmit said information to a display in response to a predetermined event, wherein said circuit initiates said video controller without booting up a computer system.

2. The apparatus of claim 1, wherein said circuit is an interface adapted to communicate with a processing device.

3. The apparatus of claim 1, wherein said circuit is a microcontroller.

4. The apparatus of claim 1, wherein said first memory device is a non-volatile memory.

5. The apparatus of claim 4, wherein said first memory device is a flash memory device.

6. The apparatus of claim 1, wherein when said circuit initiates said video controller, a central processing unit (CPU) in said computer system is in a power off state.

7. The apparatus of claim 1, further including:

a second memory device coupled to said circuit, said second memory device configured to retain a video controller initialization procedure, wherein said circuit initializes said video controller using said video controller initialization procedure.

8. A system comprising:

a first bus;

a central processing unit (CPU) coupled to said first bus;

a memory device coupled to said first bus;

a video controller coupled to said first bus and configured to control a display device;

a microcontroller coupled to said memory device;

a key to initiate said microcontroller to transfer data from said memory to said video controller for display, with said CPU is in a power off state.

9. The system of claim 8, wherein said memory device is a non-volatile memory device.

10. The system of claim 9, wherein said memory device is a flash memory device.

11. The system of claim 8, wherein said data is stored in said memory device by said CPU during power up state.

12. The system of claim 8, wherein said memory device further comprises a communication interface such that said data is stored in said memory device through an external device.

13. The system of claim 8, further comprising:

a second bus;

said microcontroller coupled to said second bus;

said video controller coupled to said second bus, wherein said microcontroller is operable to transmit said data retained in said memory device to said video controller for display on said display device using said second bus.

14. The system of claim 13, wherein said second bus is operable to be selectively powered up while said system is in a power off state.

15. A system comprising:

a bus;

a plurality of resource devices coupled to said bus including a video controller;

a memory device coupled to said bus;

a central processing unit (CPU) coupled to said bus and operable to operate in two modes, wherein in a first mode, said CPU is operable to power up and initialize said plurality of resource devices, and in a second mode, said CPU is operable to power up and initialize said video controller and using said video controller to transmit information retained in said memory device to a display device.

16. The system of claim 15, wherein said memory device is a non-volatile memory device.

17. A method comprising:

retaining information in a first memory device;

initiating a video controller without booting up a computer system; and displaying said information on a display using said video controller.

18. A method as in claim 17, further comprises retaining said information in a non-volatile memory.

19. A method as in claim 17, further comprises retaining a video controller initialization procedure in a second memory device wherein said video controller is initialized using said initialization procedure.

* * * * *